United States Patent
Seo et al.

(10) Patent No.: US 10,039,030 B2
(45) Date of Patent: Jul. 31, 2018

(54) METHOD FOR TRANSMITTING AND RECEIVING SIGNALS IN WIRELESS COMMUNICATION SYSTEM, AND DEVICE FOR PERFORMING SAME

(71) Applicant: LG ELECTRONICS INC., Seoul (KR)

(72) Inventors: Inkwon Seo, Seoul (KR); Kijun Kim, Seoul (KR); Hyungtae Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/558,046

(22) PCT Filed: Apr. 21, 2016

(86) PCT No.: PCT/KR2016/004171
§ 371 (c)(1),
(2) Date: Sep. 13, 2017

(87) PCT Pub. No.: WO2016/171494
PCT Pub. Date: Oct. 27, 2016

(65) Prior Publication Data
US 2018/0070265 A1    Mar. 8, 2018

Related U.S. Application Data
(60) Provisional application No. 62/150,868, filed on Apr. 22, 2015.

(51) Int. Cl.
*H04J 11/00* (2006.01)
*H04W 72/04* (2009.01)
(Continued)

(52) U.S. Cl.
CPC ........... *H04W 28/04* (2013.01); *H04L 1/0026* (2013.01); *H04L 1/1812* (2013.01);
(Continued)

(58) Field of Classification Search
CPC .. H04J 11/0003; H04J 11/0023; H04J 11/004; H04W 52/0238; H04W 52/243;
(Continued)

(56) References Cited

U.S. PATENT DOCUMENTS

2017/0230942 A1*   8/2017   Lim ................... H04W 72/042
2017/0272139 A1*   9/2017   Benjebbour ............ H04L 5/00

FOREIGN PATENT DOCUMENTS

| EP | 2712106 A1 * | 3/2014 | ........... H04L 5/0014 |
| KR | 10-2014-0125643 A | 10/2014 | |
| WO | WO 2014/122994 A1 | 8/2014 | |

OTHER PUBLICATIONS

Benjebbour, System-Level Performance of Downlink NOMA Combined with SU-MIMO for Future LTE Enhancements. Globecom 2014 Workshop.*

(Continued)

*Primary Examiner* — Dong-Chang Shiue
(74) *Attorney, Agent, or Firm* — Birch, Stewart, Kolasch & Birch, LLP

(57) ABSTRACT

A method for receiving signals by a first terminal in a wireless communication system supporting non-orthogonal multiple access (NOMA), according to one embodiment of the present invention, comprises the steps of: obtaining downlink control information with respect to a second terminal which is NOMA-paired with the first terminal; receiving NOMA signals in which a first physical downlink shared channel (PDSCH) with respect to the first terminal and a second PDSCH with respect to the second terminal are multiplexed by different transmission power values; and
(Continued)

removing interference by the second PDSCH from the NOMA signals on the basis of the downlink control information with respect to the second terminal. In the step of removing the interference by the second PDSCH, if the second PDSCH is re-transmitted to the second terminal by an HARQ process, the interference by the second PDSCH can be removed by reusing predetermined information obtained by the first terminal at the time of initial transmission with respect to the HARQ process.

15 Claims, 10 Drawing Sheets

(51) Int. Cl.
    *H04W 28/04*     (2009.01)
    *H04L 1/18*     (2006.01)
    *H04W 52/24*     (2009.01)
    *H04L 1/00*     (2006.01)
    *H04W 72/08*     (2009.01)
    *H04W 74/08*     (2009.01)

(52) U.S. Cl.
    CPC ....... *H04W 28/048* (2013.01); *H04W 52/243* (2013.01); *H04W 72/082* (2013.01); *H04W 74/0833* (2013.01)

(58) Field of Classification Search
    CPC ............. H04W 72/042; H04W 72/082; H04W 28/048; H04L 1/0026; H04L 1/1812
    See application file for complete search history.

(56) References Cited

OTHER PUBLICATIONS

Benjebbour et al., "System-Level Performance of Downlink NOMA Combined with SU-MIMO for Future LTE Enhancements," 2014 IEEE Globecom Workshops (GC Wkshps), Austin, TX, Dec. 8-12, 2014, pp. 706-710 (6 pages total).

NTT Docomo, Inc., "Justification for NOMA in New Study on Enhanced Multi-User Transmission and Network Assisted Interference Cancellation for LTE," 3GPP TSG RAN Meeting #66, RP-141936, Maui, USA, Dec. 8-11, 2014, pp. 1-15.

Saito et al., "Non-Orthogonal Multiple Access (NOMA) for Cellular Future Radio Access," Vehicular Technology Conference (VTC Spring), 2013 IEEE 77th, Dresden, Jun. 2-5, 2013, 6 pages.

* cited by examiner

FIG. 5
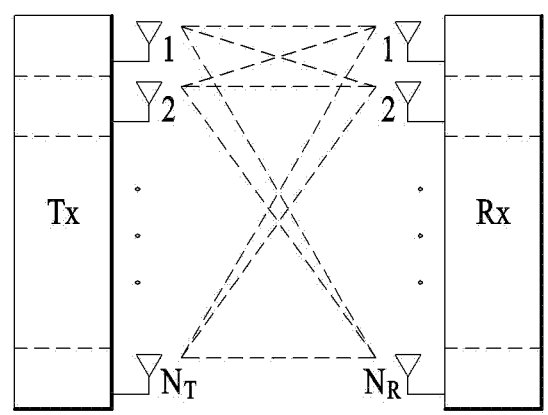
(a)
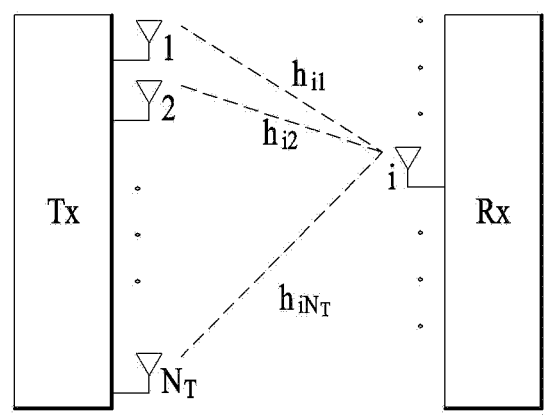
(b)

METHOD FOR TRANSMITTING AND RECEIVING SIGNALS IN WIRELESS COMMUNICATION SYSTEM, AND DEVICE FOR PERFORMING SAME

CROSS REFERENCE TO RELATED APPLICATIONS

This application is the National Phase of PCT International Application No. PCT/KR2016/004171, filed on Apr. 21, 2016, which claims priority under 35 U.S.C. 119(e) to U.S. Provisional Application No. 62/150,868, filed on Apr. 22, 2015, all of which are hereby expressly incorporated by reference into the present application.

TECHNICAL FIELD

The present invention relates to a wireless communication system, and more particularly, to a method of transmitting or receiving a signal in a wireless communication system supportive of non-orthogonal multiple access and apparatus therefor.

BACKGROUND ART

Wireless communication systems have been widely deployed to provide various types of communication services such as voice or data. In general, a wireless communication system is a multiple access system that supports communication with multiple users by sharing available system resources (e.g., bandwidth, transmit power, etc.). The multiple access system can be categorized into orthogonal multiple access (OMA) and non-orthogonal multiple access (NOMA) depending on whether orthogonality is guaranteed.

As examples of the OMA, frequency division multiple access (FDMA), time division multiple access (TDMA), code division multiple access (CDMA), spatial domain multiple access (SDMA) are included. For each of them, the multiple access is performed in a frequency domain, time domain, code domain, and spatial domain.

Meanwhile, as a multiple access scheme in a power domain, the NOMA can be interconnected with the OMA, whereby it is possible to improve spectral efficiency.

DISCLOSURE OF THE INVENTION

Technical Task

The technical task of the present invention is to provide a method and apparatus for transmitting or receiving a NOMA signal more efficiently and accurately in a wireless communication system supportive of non-orthogonal multiple access (NOMA).

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of receiving a signal by a first user equipment in a wireless communication system supporting non-orthogonal multiple access (NOMA), including obtaining downlink control information for a second user equipment NOMA-paired with the first user equipment, receiving a NOMA signal in which a first physical downlink shared channel (PDSCH) for the first user equipment and a second PDSCH for the second user equipment are multiplexed by different transmit power values, and cancelling interference caused by the second PDSCH from the NOMA signal based on the downlink control information for the second user equipment, wherein in the cancelling the interference caused by the second PDSCH, if the second PDSCH is a PDSCH retransmitted to the second user equipment by a hybrid automatic repeat request (HARQ) process, the interference caused by the second PDSCH is canceled by reusing predetermined information obtained by the first user equipment during an initial transmission for the HARQ process.

In another technical aspect of the present invention, provided herein is a first user equipment for receiving a signal in a wireless communication system supporting non-orthogonal multiple access (NOMA), the first user equipment including a receiver configured to obtain downlink control information for a second user equipment which is NOMA-paired with the first user equipment and receive a NOMA signal in which a first physical downlink shared channel (PDSCH) for the first user equipment and a second PDSCH for the second user equipment are multiplexed by different transmit power values and a processor configured to cancel interference caused by the second PDSCH from the NOMA signal based on the downlink control information for the second user equipment, wherein if the second PDSCH is a PDSCH retransmitted to the second user equipment by a hybrid automatic repeat request (HARQ) process, the processor is further configured to cancel the interference caused by the second PDSCH by reusing predetermined information obtained by the first user equipment during an initial transmission for the HARQ process.

Preferably, if the second PDSCH is the retransmitted PDSCH, the first user equipment may skip a process of decoding the second PDSCH from the NOMA signal.

Preferably, the predetermined information reused for cancelling the interference caused by the second PDSCH may include at least one of a modulation order in the initial transmission for the HARQ process, a transport block size, a new data indicator (NDI) and an information bit sequence obtained by decoding the second PDSCH.

Preferably, wherein the first user equipment may code & modulate an information bit sequence of the second PDSCH stored by the first user equipment in the initial transmission of the second PDSCH, estimate an interference signal based on a modulated symbol of the information bit sequence and a current channel state, and cancel the estimated interference signal from the NOMA signal.

Preferably, a timing of initiating a NOMA operation for the first user equipment may be differently configured for each of a plurality of HARQ processes configured in the second user equipment. More preferably, the NOMA operation for the first user equipment may be initiated in an initial transmission subframe for each of the plurality of HARQ processes.

Preferably, the first user equipment may report capability information of the first user equipment to a base station, and the capability information may include at least one of information indicating a presence or non-presence of capability of performing a NOMA operation, a size of an additional buffer for the NOMA operation, and a maximum of interferers canceled for the NOMA operation.

Preferably, if the second PDSCH is the retransmitted PDSCH, the first user equipment may assume that MCS information ($I_{MCS}$) for which transmission block size (TBS)

index is reserved is not configured in the downlink control information for the second user equipment.

Preferably, if the second PDSCH is the retransmitted PDSCH and MCS information ($I_{MCS}$) for which transmission block size (TBS) index is reserved is configured in the downlink control information for the second user equipment, the first user equipment may perform symbol level interference cancellation instead of codeword level interference cancellation.

Preferably, despite that there is no degradation in a radio link between the first user equipment and a base station, if the first user equipment is unable to perform a NOMA operation, the first user equipment may report a NOMA link failure to the base station. More preferably, the report of the NOMA link failure may be performed if a decoding failure of the first PDSCH occurs more than a first threshold, a decoding failure of the second PDSCH occurs more than a second threshold, or both failures of a decoding of the first PDSCH and a decoding of the second PDSCH occur more than a third threshold.

Advantageous Effects

According to one embodiment of the present invention, in a wireless communication system supportive of non-orthogonal multiple access (NOMA), an NOMA signal can be transmitted or received more efficiently and accurately by cancelling interference from a NOMA signal in consideration of an HARQ process.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram of configuration of a wireless communication system having multiple antennas

BEST MODE FOR INVENTION

Figure 1:
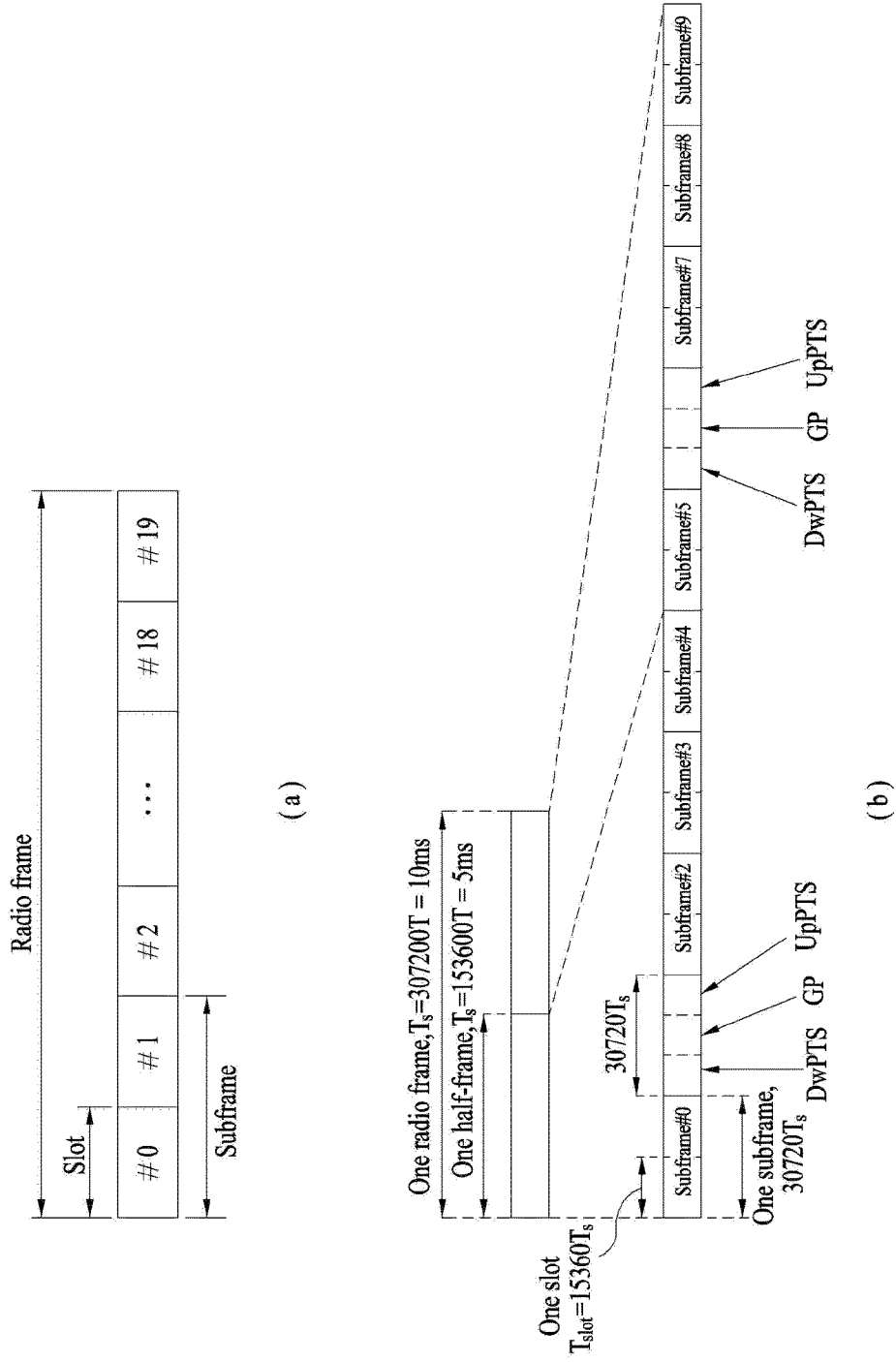
FIG. 1 is a diagram showing a structure of a radio frame.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

NOMA Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which cancels uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
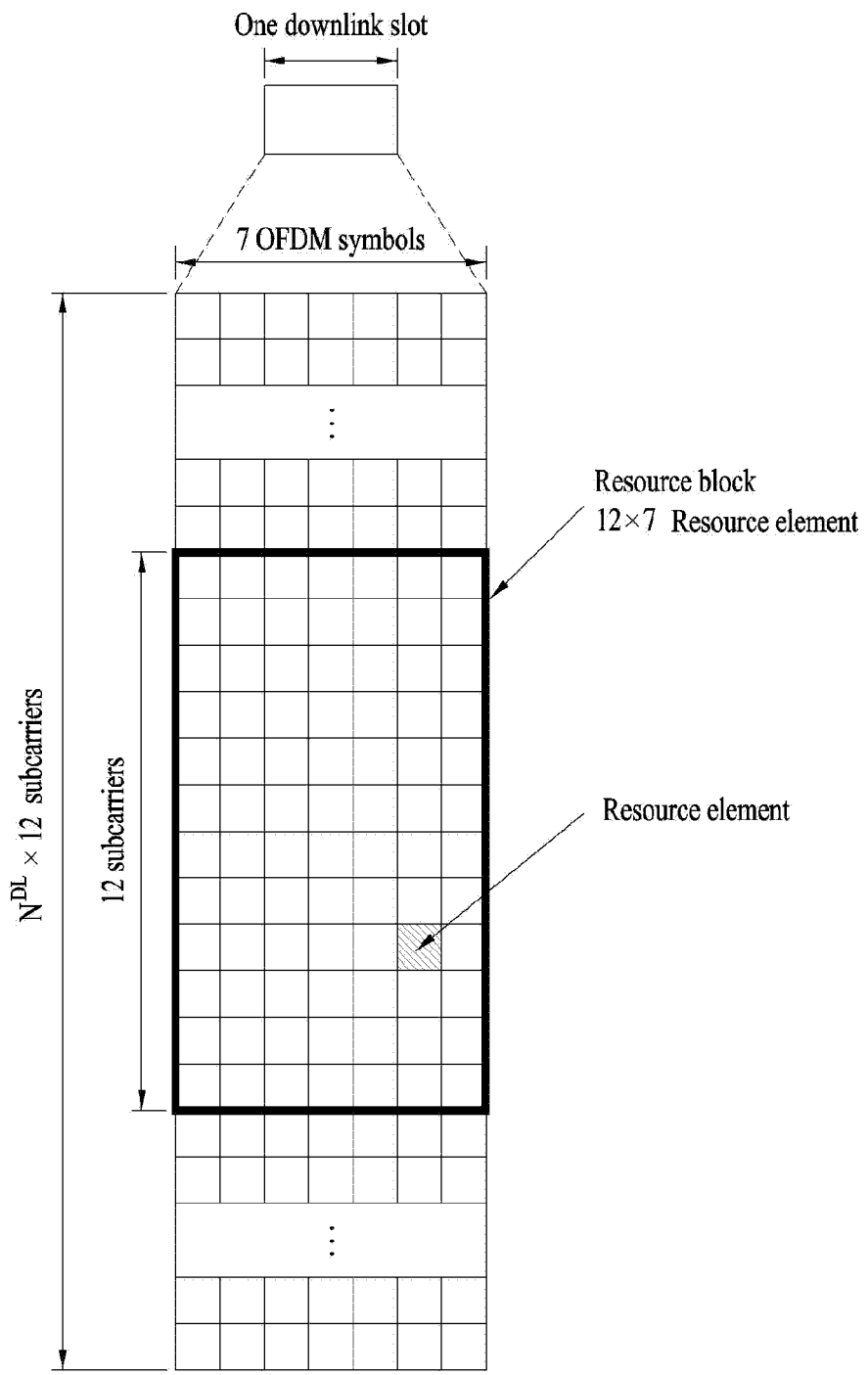
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
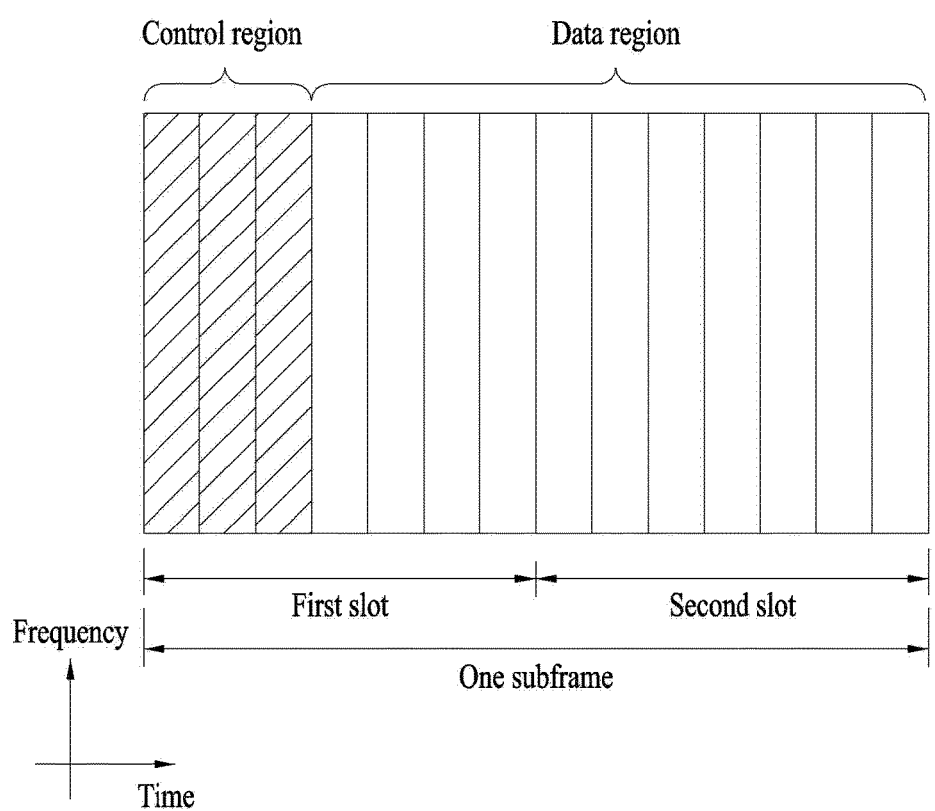
FIG. 3 is a diagram showing a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI).

If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
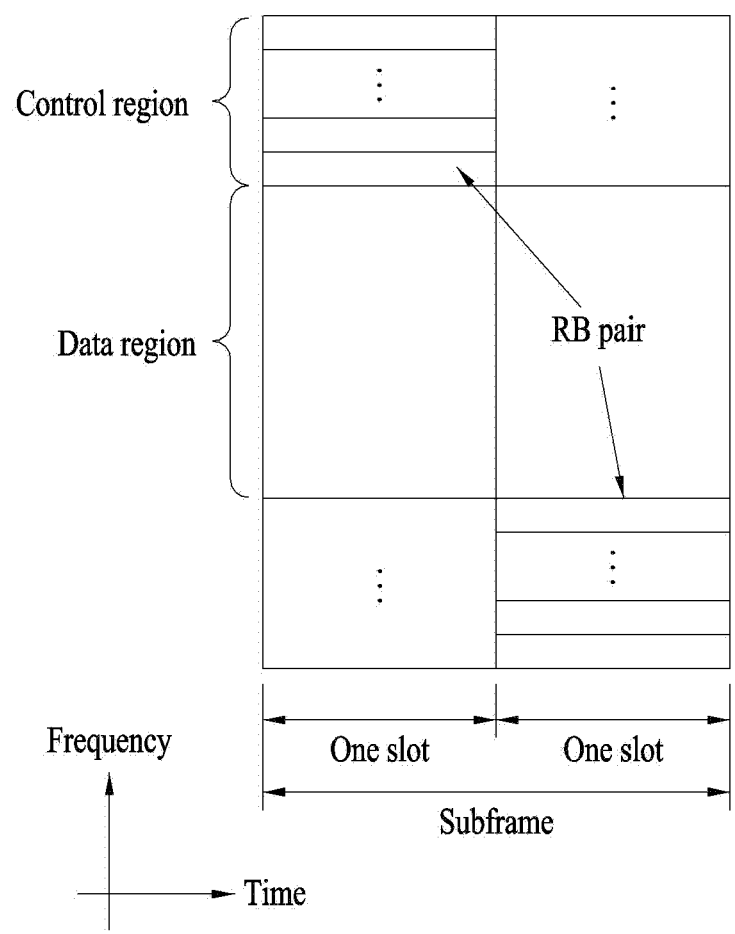
FIG. 4 is a diagram showing a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to $N_T$ and the number of receive antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are $N_T$ transmit antennas and $N_R$ receive antennas.

Regarding a transmitted signal, if there are $N_T$ transmit antennas, the maximum number of pieces of information that can be transmitted is $N_T$. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{s}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{s}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the $N_R$ receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the $N_T$ transmit antennas to the receive antenna i. The channels may be combined and expressed in the form of a vector and a matrix. In FIG. 5(b), the channels from the $N_T$ transmit antennas to the receive antenna i can be expressed as follows.

$$h_i^T = [h_{i1}, h_{i2}, \ldots, h_{iN_T}] \quad \text{[Equation 7]}$$

Accordingly, all channels from the $N_T$ transmit antennas to the $N_R$ receive antennas can be expressed as follows.

[Equation 8]

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix}$$

An AWGN (Additive White Gaussian Noise) is added to the actual channels after a channel matrix H. The AWGN $n_1, n_2, \ldots, n_{N_R}$ respectively added to the $N_R$ receive antennas can be expressed as follows.

$$n = [n_1, n_2, \ldots, n_{N_R}]^T \quad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n$$

Meanwhile, the number of rows and columns of the channel matrix H indicating the channel state is determined by the number of transmit and receive antennas. The number of rows of the channel matrix H is equal to the number $N_R$ of receive antennas and the number of columns thereof is equal to the number $N_R$ of transmit antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

Initial Access Procedure

Figure 6:
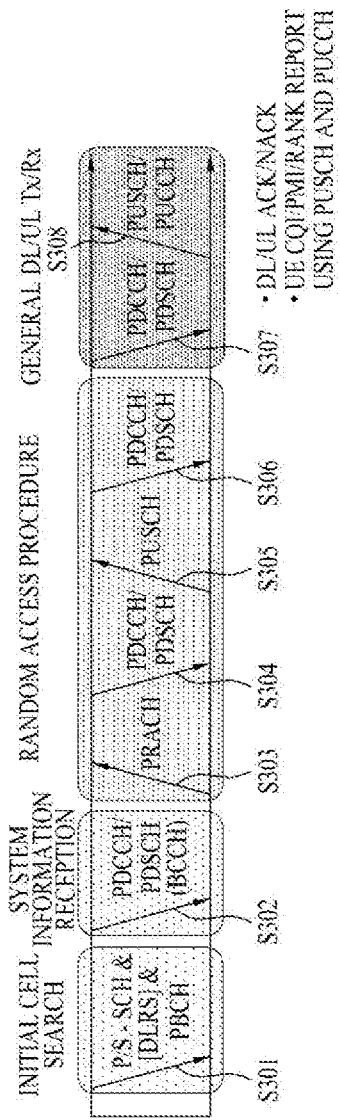
FIG. 6 is a diagram to describe an initial access procedure used for a 3GPP system and a signal transceiving method using physical channels.

FIG. 6 is a diagram to describe an initial access procedure and signal transceiving method of a 3GPP system.

If a power of a UE is turned on or the UE newly enters a cell, the UE performs an initial cell search for matching synchronization with a base station and the like [S301]. To this end, the UE receives PSS and SSS from the base station, matches synchronization with the base station and then obtains information such as a cell ID and the like. Subsequently, the UE receives PBCH (physical broadcast channel) from the base station and is then able to obtain intra-cell broadcast information. Meanwhile, the UE receives a downlink reference signal (DL RS) in the initial cell searching step and is then able to check a downlink channel status.

Having completed the initial cell search, the UE receives a physical downlink control channel (PDCCH) and a physical downlink shared control channel (PDSCH) according to information carried on the physical downlink control channel (PDCCH) and is then able to obtain system information in further detail [S302].

Meanwhile, if the UE initially accesses the base station or fails to have a radio resource for signal transmission, the UE may perform a random access procedure (RACH) on the base station [steps S303 to S306]. To this end, the UE transmits a specific sequence as a preamble via a physical random access channel (PRACH) [S303, S305] and is then able to receive a response message via PDCCH and a corresponding PDSCH in response to the preamble [S304, S306]. In case of contention based RACH, a contention resolution procedure may be performed in addition.

Having performed the above mentioned procedures, the UE may perform PDCCH/PDSCH reception [S307] and PUSCH/PUCCH (physical uplink shared channel/physical uplink control channel) transmission [S308] as a general uplink/downlink signal transmission procedure. In particular, the UE receives a downlink control information (DCI) via PDCCH. In this case, the DCI includes such control information as resource allocation information on a UE and may differ in format in accordance with the purpose of its use.

Meanwhile, control informations transmitted to or received from the base station by the UE include DL/UL ACK/NACK signal, CQI (channel quality indicator), PMI (precoding matrix index), RI (rank indicator) and the like. In case of the 3GPP LTE system, the UE may transmit the above-mentioned control informations such as CQI, PMI, RI and the like via PUSCH and/or PUCCH.

Processing of Downlink Physical Channel

In the following, a processing of a downlink (DL) physical channel is schematically described. For clarity, although description of an uplink is omitted, some points of a downlink channel processing are applicable to an uplink (UL) channel processing as well.

In an MIMO structure using multiple codewords (MCW), for example, it is able to consider transmitting maximum 2 codewords simultaneously. For such an MIMO transmission, required are MCS (modulation and coding scheme) information on a modulation and coding scheme used by a transmitting end, a new data indicator (NDI) indicating whether a transmitted data is a new data or a retransmitted data, redundancy version (RV) information indicating what kind of subpacket is retransmitted in case of retransmission, and the like. MCS, NDI, RV information and the like may be defined per transport block.

A plurality of transport blocks may be mapped to a plurality of codewords by the transport block-to-codeword mapping rule. For example, assume that 2 transport blocks are denoted by TB1 and TB2, respectively. And, assume that 2 codewords are denoted by CW0 and CW1, respectively. If both of the transport blocks TB1 and TB2 are enabled, the first transport block TB1 and the second transport block TB2 can be mapped to the first codeword CW0 and the second codeword CW1, respectively. Or, according to a transport block-to-codeword swap flag, the first transport block TB1 and the second transport block TB2 may be mapped to the second codeword CW1 and the first codeword CW0, respectively. Meanwhile, if one of the two transport blocks is disabled only but the other is enabled, the enabled transport block may be mapped to the first codeword CW0. Namely, a transport block and a codeword have the one-to-one mapped relation. Moreover, a case of disabling a transport block includes a case that a size of the transport block is 0. If a size of a transport block is 0, the corresponding transport block is not mapped to a codeword.

Figure 7:
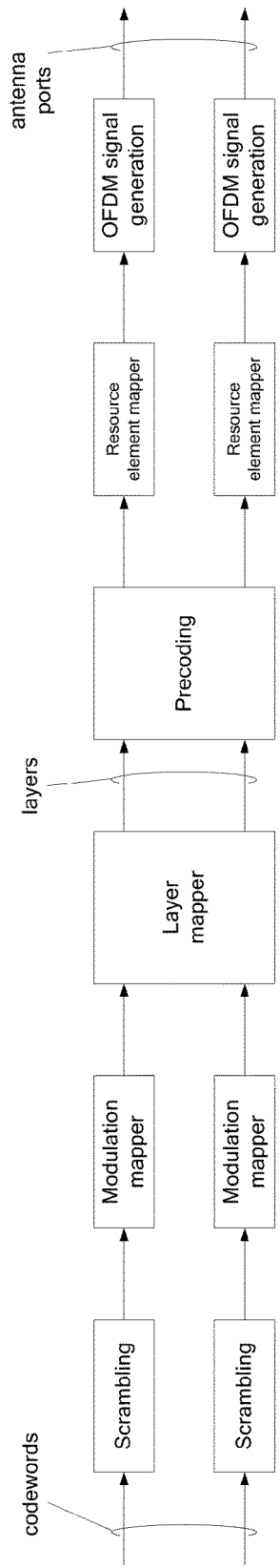
FIG. 7 is a diagram to describe a processing of a downlink physical channel in a 3GPP system.

FIG. 7 is a diagram to describe a processing of a downlink physical channel in a 3GPP system.

One or more codewords through a coding process by an encoder can be scrambled using a UE-specific scrambling signal. The scrambled codeword is demodulated into a complex symbol according to a type of a transmitted signal and/or a channel state. For instance, PHICH is modulated by BPSK scheme, and PDSCH or PMCH is modulated by QPSK, 16 QAM, 64 QAM or 256 QAM scheme. Thereafter, the modulated complex symbol is mapped to one or more layers. If a signal is transmitted using a single antenna, one codeword is transmitted by being mapped to one layer as it is. Yet, in case of transmitting a signal using a multi-antenna, the codeword-to-layer mapping relation varies depending on whether a transmission scheme is a spatial multiplexing scheme or a transmit diversity scheme.

A single codeword may be transmitted by being mapped to a single layer by symbol unit. Yet, a single codeword may be mapped in a manner of being distributed to maximum 4 layers. Hence, in case that 2 codewords exist, maximum 8 (=4+4) layers may be transmitted. In case that a single codeword is transmitted by being distributed to a plurality of layers, symbols configuring each codeword may be transmitted by being mapped per layer sequentially. Meanwhile, in case of a single codeword based transmission configuration, an encoder and a modulation block exist one by one only.

Thus, DFT (discrete Fourier transform) may apply to the layer mapped signal. And, the layer mapped signal may be assigned to each transmitting antenna by being multiplied by a prescribed precoding matrix selected according to a channel state. In order not to increase a transmission PAPR (or CM) of a UE while applying a prescribed precoding in DFT-s-OFDMA configuration, the precoding may be performed in a frequency domain after applying the DFT.

The above-processed transmitted signal per antenna is mapped to a time-frequency resource element to be used for transmission, and may be then transmitted through each antenna through an OFDM signal generator.

A base station (BS) may inform a user equipment (UE) of control information (e.g., DCI) for downlink (DL) signal transmission. Such control information may include at least one portion of DL transmission resource allocation information, layer number, precoding information, MCS information, HARQ process number, RV (redundancy version) and new data indicator (NDI), by which the control information is non-limited. The user equipment may receive a DL signal (e.g., PDSCH) using the above control information indicated by the base station. If there exist maximum 2 CWs used for transmission, 2 MCSs, 2 RBs (redundancy versions) and 2 NDIs (new data indicators) may be defined in the control information. In such control informations, for example, a field indicating MCS may be set with 5 bits.

Table 1 and Table 2 shows exemplary configurations of an MCS field for each DL data transmission (PDSCH).

Referring to Table 1, an MCS field having 29 states denoting MCS by a combination of a modulation order and a transport block size (TBS) index and 3 states denoting MCS by a modulation order only can be configured for PDSCH.

TABLE 1

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |

TABLE 1-continued

| MCS Index $I_{MCS}$ | Modulation Order $Q_m$ | TBS Index $I_{TBS}$ |
|---|---|---|
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26/26A |
| 29 | 2 | reserved |
| 30 | 4 | |
| 31 | 6 | |

Table 2 is provided to support 256 QAM. If a higher layer parameter altCQI-Table-r12 is set, Table 2 is used instead of Table 1.

TABLE 2

| MCS Index $I_{MCS}$ | Modulation Order $Q_m$ | TBS Index $I_{TBS}$ |
|---|---|---|
| 0 | 2 | 0 |
| 1 | 2 | 2 |
| 2 | 2 | 4 |
| 3 | 2 | 6 |
| 4 | 2 | 8 |
| 5 | 4 | 10 |
| 6 | 4 | 11 |
| 7 | 4 | 12 |
| 8 | 4 | 13 |
| 9 | 4 | 14 |
| 10 | 4 | 15 |
| 11 | 6 | 16 |
| 12 | 6 | 17 |
| 13 | 6 | 18 |
| 14 | 6 | 19 |
| 15 | 6 | 20 |
| 16 | 6 | 21 |
| 17 | 6 | 22 |
| 18 | 6 | 23 |
| 19 | 6 | 24 |
| 20 | 8 | 25 |
| 21 | 8 | 27 |
| 22 | 8 | 28 |
| 23 | 8 | 29 |
| 24 | 8 | 30 |
| 25 | 8 | 31 |
| 26 | 8 | 32 |
| 27 | 8 | 33/33A |
| 28 | 2 | reserved |
| 29 | 4 | |
| 30 | 6 | |
| 31 | 8 | |

If a prescribed CW is disabled, In MCW MIMO system for transmitting a plurality of codewords (e.g., if a prescribed CW is unnecessary since data supposed to be sent to a buffer of a transmitting end is sent almost all, if a retransmission of a prescribed CW remains only in HARQ transmission), it can be indicated, through DCI, that CW is disabled. In particular, in DCI format for DL PDSCH transmission, it can be indicated that a transport block is disabled if $I_{MCS}=0$ and $rv_{idx}=1$ and that a transport block is enabled otherwise. Namely, by a combination of a bit field indicating MCS and a bit field indicating RV, whether a prescribed codeword is disabled can be denoted.

A value of MCS field of DCI means MCS index ($I_{MCS}$) in Table 1 and Table 2. If $I_{MCS}$ is 29~31 in Table 1 or $I_{MCS}$ is 28~31 in Table 2, it is a state that TBS index is reserved. Thus, $I_{MCS}$ in the TBS index reserved state may be used for retransmission of TB. If the $I_{MCS}$ in the TBS index reserved state is used, a size of a retransmitted TB is set equal to a TBS (transport block size) used in transmitting the same TB previously. Namely, a size of a retransmitted TB is set equal to a size of a previously transmitted TB and a modulation order of the retransmitted TB is set to a value indicated by $I_{MCS}$.

NOMA (Non-Orthogonal Multiple Access)

As one of methods for increasing system throughput and the like in a wireless communication system, Non-Orthogonal Multiple Access (hereinafter abbreviated 'NOMA') operation is considered. In an existing OFDMA system, a resource is allocated per UE in frequency-time domain. Yet, in a NOMA system, on the assumption that an interference cancellation receiver is used, a plurality of UEs are assigned to the same frequency-time resource based on a previously determined power ratio. Interference between UEs assigned to the same frequency-time resource can be reduced through the interference cancellation receiver. Thus, the NOMA system is mentioned as a technology candidate of the future 5G system as a multi-access scheme capable of improving efficiency of bandwidth use.

Figure 8:
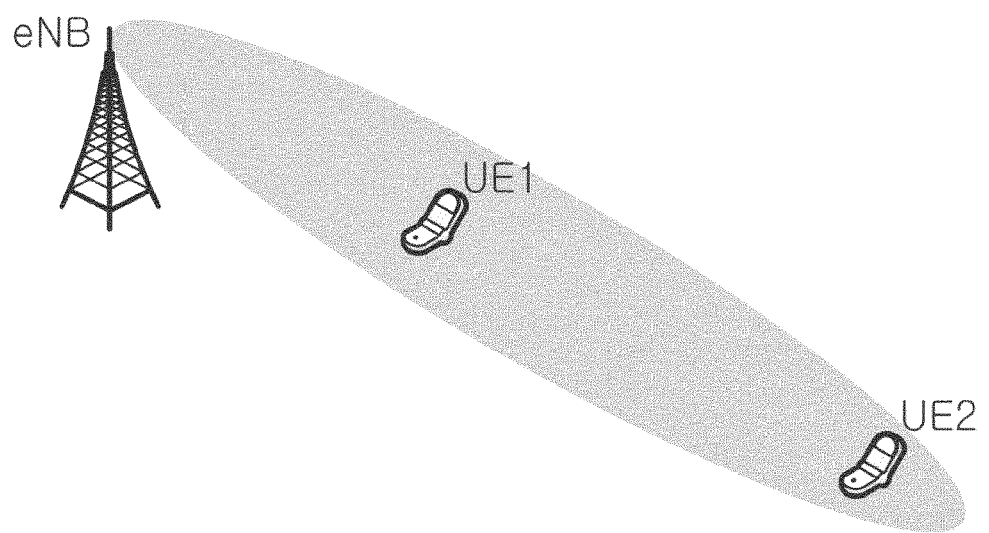
FIG. 8 shows one example of a NOMA environment according to one embodiment of the present invention.

FIG. 8 shows one example of a NOMA environment according to one embodiment of the present invention.

In a NOMA environment, UEs (user equipments) having different transmit powers assigned thereto can be configured as a NOMA pair. In FIG. 8, for clarity, it is illustrated that 2 UEs UE1 and UE2 configure a NOMA pair. And, it is not excluded that more UEs configure a NOMA pair or group.

A base station sets a different DL Tx power per UE belonging to a NOMA pair and is able to send a NOMA signal by superposing modulated symbols of each UE. For example, a relatively small transmit power is set for the UE 1 and a relatively large power is set for the UE 2. Hence, a transmit power assigned to the UE 2 is set greater than the transmit power assigned to the UE 1 in the total transmit power of the NOMA signal.

For clarity of the following description, a UE (e.g., UE 1), to which a low power is assigned because the UE is located in a short distance from a base station (or, because a channel state is good), shall be named a CUE (center UE). And, a UE (e.g., UE 2), to which a high power is assigned because the UE is located in a long distance from a base station (or, because a channel state is poor), shall be named an EUE (edge UE).

In an NOMA system, a CUE cancels interference caused to a received NOMA signal by an EUE signal and is then able to decode a CUE signal. So to speak, since a transmit power of the EUE signal in the NOMA signal is greater than a transmit power of the CUE signal, if the interference caused by the EUE signal is cancelled from the NOMA signal, the CUE can correctly decode the CUE signal.

Meanwhile, the EUE may decode an EUE signal without the interference cancellation process. This is because the transmit power of the CUE signal over the transmit power of the EUE signal can be negligibly small in aspect of the EUE. Yet, the EUE is not prohibited from cancelling the interference caused by the CUE signal from the NOMA signal to improve reception performance of the EUE.

In the following description, through NOMA operation, PDSCH sent to a CUE shall be named C-PDSCH and PDSCH sent to an EUE shall be named E-PDSCH. Downlink (DL) control information for scheduling C-PDSCH shall be named C-DCI, and downlink (DL) control information for scheduling E-PDSCH shall be named E-DCI.

According to one embodiment of the present invention, C-DCI and E-DCI can be transmitted to CUE through independent PDCCHs, respectively. For example, C-DCI is transmitted through C-PDCCH (i.e., PDCCH for CUE), and E-DCI is transmitted through E-PDCCH (i.e., PDCCH for EUE). C-PDCCH and E-PDCCH may be individually transmitted instead of being transmitted as a single NOMA signal. CUE receives C-PDCCH and may additionally overhear E-PDCCH.

According to another embodiment of the present invention, a new DCI format may be defined for NOMA operation. For example, a new DCI format can include both C-DCI information and E-DCI information, and a new DCI having C-DCI and E-DCI combine therein may be transmitted through PDCCH. A new DCI format may be transmitted by Non-NOMA scheme. A new DCI format may be set in common to CUE and EUE. For example, CUE obtains both C-DCI and E-DCI by decoding a new DCI format, and EUE may use an E-DCI part only by decoding the new DCI format.

Interference Cancellation in NOMA System

For elimination or cancellation of an EUE signal, an eNB may send information on the EUE signal to a CUE. The CUE should perform demodulation in consideration of a signal of an EUE having a relatively large power while using a same resource (e.g., time, frequency, space). For example, the CUE generates an interference signal (e.g., EUE signal) based on the information on the EUE signal and is then able to obtain its signal (e.g., CUE signal) by cancelling the interference signal from a received NOMA signal.

A method for a CUE to cancel interference caused by an EUE signal in a NOMA system can be classified into Symbol-Level Interference Cancellation (hereinafter abbreviated 'SLIC') or CodeWord-level Interference Cancellation (hereinafter abbreviated 'CWIC').

SLIC means a scheme of cancelling a modulated symbol of an interference signal from a received symbol by estimating the interference signal up to a modulated symbol level only. Therefore, in SLIC, decoding of an interference signal is not performed but decoding can be performed on its signal only.

According to CWIC, a CUE obtains an information bit sequence (e.g., codeword) by performing decoding on an interference signal as well as demodulation. Thereafter, the CUE encodes and modulates the information bit sequence (e.g., encoding and modulation of codeword like a transmitter). The CUE obtains its signal (e.g., CUE signal) by cancelling a signal (e.g., an estimated EUE signal) resulting from multiplying a modulated symbol generated from modulation result and an estimated channel component from a received signal (e.g., a received NOMA signal).

CWIC has interference cancellation performance better than that of SLIC. Yet, CWIC even requires needs information for decoding, whereas SLIC requires schematic information on modulation order of an interference signal only. Hence, in case of CWIC, a size information (e.g., information on an interference signal or an EUE signal) supposed to be delivered to a CUE increases in comparison with a case of SLIC.

NOMA in Consideration of HARQ Operation

According to one embodiment of the present invention, interference cancellation by CWIC can be performed in consideration of an HARQ operation.

In aspect of buffer management and the like, the simplest interference cancellation scheme is performed in a manner that a CUE does not consider an HARQ operation of an EUE. For example, the CUE can perform interference cancellation using a decoding result of an EUE signal in a current subframe only. If the decoding of the EUE signal is successful, the CUE can perform CWIC. If failing in the decoding of the EUE signal, the CUE may not perform the interference cancellation or may perform SLIC in the corresponding subframe.

According to one embodiment of the present invention, proposed is a method for performing a NOMA operation robust to an HARQ operation of an EUE. Or, if a UE category is determined by a buffer size for a NOMA operation or the like, an embodiment of the present invention is applicable to a UE class failing to have a buffer for storing an interference signal (interferer signal) or a UE class having a small buffer size.

If a UE (e.g., CUE) receiving information on interference receives $I_{MCS}$ in TBS index reserved state in the aforementioned Table 1 or Table 2 (as information on EUE), since the corresponding UE cannot be aware of TBS of an interference signal, it may cause a problem in performing CWIC. For example, in case that a CUE performs interference cancellation using a decoding result in a corresponding subframe only, it may happen that the CUE cannot be aware of TBS of an EUE.

In the following, methods for solving the above problem are described. Indexes given to the following embodiments are provided for clarity. By combining embodiments having different indexes together, one invention can be configured. Or, embodiments having different indexes may be individually implemented.

Embodiment 1

According to one embodiment of the present invention, an eNB may not assign $I_{MCS}$ in TBS index reserved state to an EUE of a NOMA UE pair performing a NOMA operation. Or, the eNB may not schedule a NOMA operation for the UE to which the $I_{MCS}$ in the TBS index reserved state is assigned.

For example, a CUE may assume that $I_{MCS}$ in TBS index reserved state is not assigned to an EUE belonging to the same NOMA UE pair of a CUE. Yet, in case that the $I_{MCS}$ in TBS index reserved state is assigned to the EUE, the same method as Embodiment 2 mentioned in the following may be usable.

In configuring a NOMA UE pair, an eNB can set a coding rate of E-PDSCH to enable E-PDSCH for EUE to be self-decodable with a signal received in a corresponding subframe only. For example, MCS configuration for EUE is conservatively performed in order to prevent occurrence of retransmission of E-PDSCH for the EUE. In case of using a high modulation order (e.g., 256 QAM), probability for EUE to succeed in receiving E-PDSCH may be relatively low in comparison with a case of using a low modulation order (e.g., QPSK). If an EUE fails in receiving E-PDSCH, since retransmission of E-PDSCH is requested, it is preferable that an eNB transmits E-PDSCH using a modulation order low enough to prevent retransmission of E-PDSCH from being requested. For example, if an eNB sends a signal to an EUE by a NOMA scheme, a usable modulation order is limited or a lower modulation order may be used in comparison with a case of sending a signal by a non-NOMA scheme.

Moreover, an eNB may configure a NOMA UE pair for NOMA operation in order to enable a CUE to decode E-PDSCH with information of E-DCI sent to the CUE through a corresponding subframe. For example, in configuring a NOMA UE pair to initiate a NOMA operation, an eNB can exclude a retransmission performing UE from EUEs.

Embodiment 2

According to one embodiment of the present invention, in case that a CUE cannot be aware of TBS of an EUE despite that a CUE correctly receives a DCI, the CUE may be set not to perform CWIC. For example, a CUE receives a new DCI for NOMA usage or overhears E-DCI of an EUE. As a result, if $I_{MCS}$ of the EUE ranges 29~31 in Table 1 (or, 28~31 in Table 2 if altCQI-Table-r12 is set), the CUE may be defined not to perform CWIC.

Or, since a modulation order is indicated in $I_{MCS}$ in TBS index reserved state, if such $I_{MCS}$ is signaled to an EUE, a CUE may be set to perform SLIC. For example, despite that a CUE receives a signaling, which indicates that a NOMA operation is currently performed, from an eNB, if the CUE detects $I_{MCS}$ in TBS index reserved state as a result from overhearing E-DCI of an EUE, the CUE may assume that the NOMA operation is not performed in a corresponding subframe. Or, if the CUE detects $I_{MCS}$ in TBS index reserved state as a result from overhearing E-DCI of an EUE, the CUE may use SLIC instead of CWIC or receive a signal through ML (maximum likelihood) scheme.

Meanwhile, if a coding rate of E-PDSCH received in a corresponding subframe is higher than a specific value, a CUE may not perform CWIC. In this case, the CUE may be set to perform SLIC instead of CWIC. For example, the specific value of the coding rate may be determined based on SINR of an EUE signal measured by the CUE. The CUE measures the SINR of the EUE signal and then determines a threshold of a decodable coding rate based on the measured SINR of the signal. If MCS having low decoding probability in comparison with the determined threshold of the coding rate, the CUE may perform SLIC in the corresponding subframe.

The embodiment 1 and/or the embodiment 2 may be limitedly applicable to a case that a CUE has no buffer for storing an EUE signal or a case that a buffer is small. The buffer for storing the EUE signal can be represented as UE capability, UE category or the like. And, each UE can report UE capability for a NOMA operation to an eNB.

Meanwhile, UE capability may be newly defined for NOMA, or may be defined in a manner of adding a NOMA related item to the metric of the existing UE capability. For example, UE capability may contain a presence or non-presence of capability of performing a NOMA operation, a size of a buffer additionally retained in addition to a buffer required for OMA (orthogonal multiple access), and some or all of the number of interferers that can be simultaneously interference-cancelled (e.g., the number of interferers introduced on different resources may be included as well as interference cancellation on the same resource). The number of interferers may mean the number of TBs decodable by an EUE within a given time.

For example, one frequency among DL resources allocated to a CUE is multiplexed with EUE1 and another frequency is multiplexed with EUE2, the CUE should be able to perform decoding on 2 interferers (or TBs).

Embodiment 3

According to one embodiment of the present invention, a CUE may store the whole DCI of an EUE or HARQ related partial information (e.g., $I_{MCS}$, NDI related field, etc.) in the DCI. Or, the CUE may determine an operation of the CUE at a next HARQ timing of the EUE based on DCI of the EUE.

Meanwhile, an operation for a CUE to store DCI of an EUE may be limitedly performed on DCI information on an initial transmission of each HARQ process of an EUE. For example, if DCI currently transmitted to an EUE schedules data initially transmitted to the EUE and indicates a specific HARQ process of the EUE, a CUE deletes a past DCI of the EUE previously stored for the indicated HARQ process and is able to store the currently transmitted DCI. For example, each time each HARQ process of the EUE is reset, the CUE stores a DCI of the EUE resetting the corresponding HARQ process. Yet, if DCI currently transmitted to an EUE schedules data initially transmitted to the EUE and indicates a specific HARQ process of the EUE, a CUE maintains a past DCI of the EUE previously stored for the indicated HARQ process and may not store the currently transmitted DCI.

Meanwhile, whether it is an initial transmission or retransmission of data may be determined depending on whether new data indicator (NDI) in a DCI format is toggled. For example, a base station sets an NDI included in a DCI for scheduling retransmission to the same value of an NDI of a previously transmitted DCI. The base station sets an NDI of a DCI for scheduling initial transmission to a value resulting from inverting an NDI of a previously transmitted DCI. Yet, in case that the pairing of a NOMA UE pair is set after an initial transmission of an EUE, since a CUE cannot be aware of an NDI value of a DCI used for the initial transmission, it may cause a problem that it is unable to determine whether it is an initial transmission or a retransmission through an NDI of a currently received EUE DCI.

As one embodiment for solving such a problem, limitation may be put in a manner that a NOMA operation is initiated in a subframe for performing initial transmission for an EUE. For example, if an initial transmission performed subframe differs per HARQ process, it means that a timing of initiating a NOMA operation per HARQ process may be different. Moreover, although it is a subframe after initiating a NOMA operation, there may exist a subframe in which a NOMA operation is not performed. For example, although a NOMA operation (for HARQ process #0) is initiated in a subframe #n, if retransmission to an EUE according to HARQ process #1 is performed in a subframe #n+1, a NOMA operation for HARQ process #1 cannot be performed in the subframe #n+1. Thus, the present embodiment may be interpreted as a NOMA operation is defined per HARQ process. Namely, NOMA operation is not performed continuously after a specific timing, but a start timing of NOMA operation may be set different per HARQ process. For example, having received a signaling indicating that NOMA operation will start, a UE can assume that NOMA operation of a corresponding HARQ process is performed from a timing at which each HARQ process of an EUE starts after the corresponding timing.

As another method, if DCI of CUE and DCI of EUE are signaled at a time through NOMA DCI newly defined for NOMA, the NOMA DCI may contain at least one of information indicating a presence or non-presence of initial transmission for the EUE and information indicating TBS used for the initial transmission for the EUE. Unlike NDI, information indicating a presence or non-presence of initial transmission may indicate that each state means initial transmission or retransmission. So to speak, although each state of information indicating a presence or non-presence of initial transmission absolutely means initial transmission or retransmission, there is a difference in that NDI means initial transmission or retransmission depending on a presence or non-presence of toggle. Moreover, NDI transmitted to the EYE may not be contained in the NOMA DCI transmitted to the CUE.

For a more smooth NOMA operation, each UE can report information on a receiver type (e.g., CWIC, SLIC, ML), which is to be used by the UE when the UE operates as a CUE of NOMA operation, to an eNB. For example, if a UE having reported to use CWIC is set as a CUE of NOMA operation, an eNB may forward information on EUE to the corresponding UE by the scheme described through the embodiment 3.

Embodiment 4

According to one embodiment of the present invention, a CUE can store successfully decoded E-PDSCH (e.g., decoded, uncoded or coded information sequence) and/or some or all of E-DCI for scheduling the successfully decoded E-PDSCH.

Some or all of the E-DCI for scheduling the successfully decoded E-PDSCH, as described in the embodiment 3, may include $I_{MCS}$ and/or NDI related field. If $I_{MCS}$ in TBS index reserved state is used in DCI for scheduling retransmission of E-PDSCH, a CUE can obtain TBS through $I_{MCS}$ stored beforehand for the corresponding E-PDSCH. Yet, since a modulation order can be indicated by DCI (e.g., $I_{MCS}$ in TBS index reserved state) for scheduling retransmission, the CUE can code and modulate E-PDSCH by combining the modulation order indicated for the retransmission of E-PDSCH and a previously stored TBS.

Thereafter, if retransmission to the EUE is performed according to the same HARQ process, the CUE may skip the decoding of the retransmitted E-PDSCH, estimate an interference signal based on data stored by being successfully decoded (e.g., encoding the stored data and then generating an interference signal based on the encoded data and an estimated channel (at a current timing), and perform interference cancellation on NOMA signal. For example, as the EUE fails in decoding E-PDSCH successfully decoded by the CUE, if retransmission of E-PDSCH is performed, the CUE does not decode the retransmitted E-PDSCH in a current subframe for retransmitting E-PDSCH but may perform NOMA operation based on data stored by being successfully decoded previously and a currently estimated channel state.

NOMA Link Monitoring

As described above, NOMA operation may be referred to as multiple access in a power domain. For example, in the NOMA operation, DL Tx power can be interpreted as transmitted by being distributed to CUE and EUE.

Hence, if decoding performance of CUE is on a low level, NOMA operation may degrade system performance. The reason for this is described as follows. First of all, in NOMA operation, Tx power possibly allocated to CUE is reduced by Tx power allocated to EUE. If most of the Tx power is allocated to the EUE, the CUE on low level of decoding performance may fail in decoding its signal.

To solve such a problem, according to one embodiment of the present invention, CUE and/or EUE may report a monitoring result for NOMA operation to an eNB. Such an operation of the CUE or EUE shall be named NOMA link monitoring.

The NOMA link monitoring may be performed in a manner of being limited to a case of being unable to receive a signal through NOMA operation despite that there is no problem in a link between an eNB and a CUE or an EUE. For example, if NOMA operation is not performed, a corresponding UE may correctly receive a signal from an eNB (e.g., a good state of a link between eNB and CUE/EUE). Yet, if it is determined that a signal cannot be received from the eNB due to performing the NOMA operation, NOMA link monitoring may be performed. The NOMA link monitoring may be performed with reference to the following.

(1) (When a CUE overhears DCI for E-PDSCH) If the CUE fails in E-PDSCH decoding (consecutively) over predetermined times, the CUE may report NOMA link failure to an eNB. For example, in a subframe for performing NOMA operation after receiving a signaling indicating that the NOMA operation will be performed, (i) when the CUE is unable to overhear (or, blind-detect) DCI for E-PDSCH or (ii) when the CUE fails in E-PDSCH decoding despite succeeding in E-DCI decoding, if the case (i) or the case (ii) is repeated over predetermined times, the CUE can report NOMA link failure to the eNB.

(2) After performing interference cancellation, if a CUE fails in decoding C-PDSCH consecutively over predetermined times, the CUE can report NOMA link failure to an eNB. Such a NOMA link failure reporting process may proceed by 2 steps. For example, if failing in the decoding of C-PDSCH, the CUE preferentially performs the existing link adaptation. If failing in the link adaptation for a predetermined time or over predetermined times, the CUE may report the NOMA link failure to the eNB. For example, the CUE may be interpreted as recognizing the cause of the consecutively occurring decoding failure as residual interference still existing after the interference cancellation.

(3) If a subframe in which E-PDSCH and C-PDSCH simultaneously fail in decoding continues over predetermined times, a CUE can report NOMA link failure to an eNB. Such a NOMA link failure report may mean a case that the CUE fails in SLIC performed after failure in CWIC for E-PDSCH. For example, although the CUE attempts decoding of C-PDSCH by SLIC scheme instead of CWIC scheme due to the failure in the decoding of E-PDSCH, the CUE may fail in decoding of C-PDSCH even using the SLIC scheme.

(4) (When a CUE overhears E-DCI) If the CUE fails in decoding E-DCI (consecutively) over predetermined times, the CUE may report NOMA link failure to an eNB.

(5) When an EUE supports NOMA operation, although a link state between an eNB and the EUE is good, if decoding of E-PDSCH is not successful consistently in NOMA operation performed subframe, the EUE may report NOMA link failure to the eNB.

In case of the existing RLF (radio link failure), since a problem is caused to a link between an eNB and a UE, the UE is unable to make a report to the eNB. Hence, the UE declares RLF by itself and a procedure for link configuration proceeds. Yet, since NOMA link failure is attributed not to a problem of a link between the eNB and the UE but to NOMA operation, the NOMA link failure can be reported to the eNB. Having received the report of the NOMA link failure, the eNB may perform an operation of reconfiguring power for the CUE or EUE, reconfiguring MCS/TBS and the like for E-PDSCH, reconfiguring a NOMA UE pair, stopping NOMA operation or the like, by which such an operation is non-limited.

Figure 9:
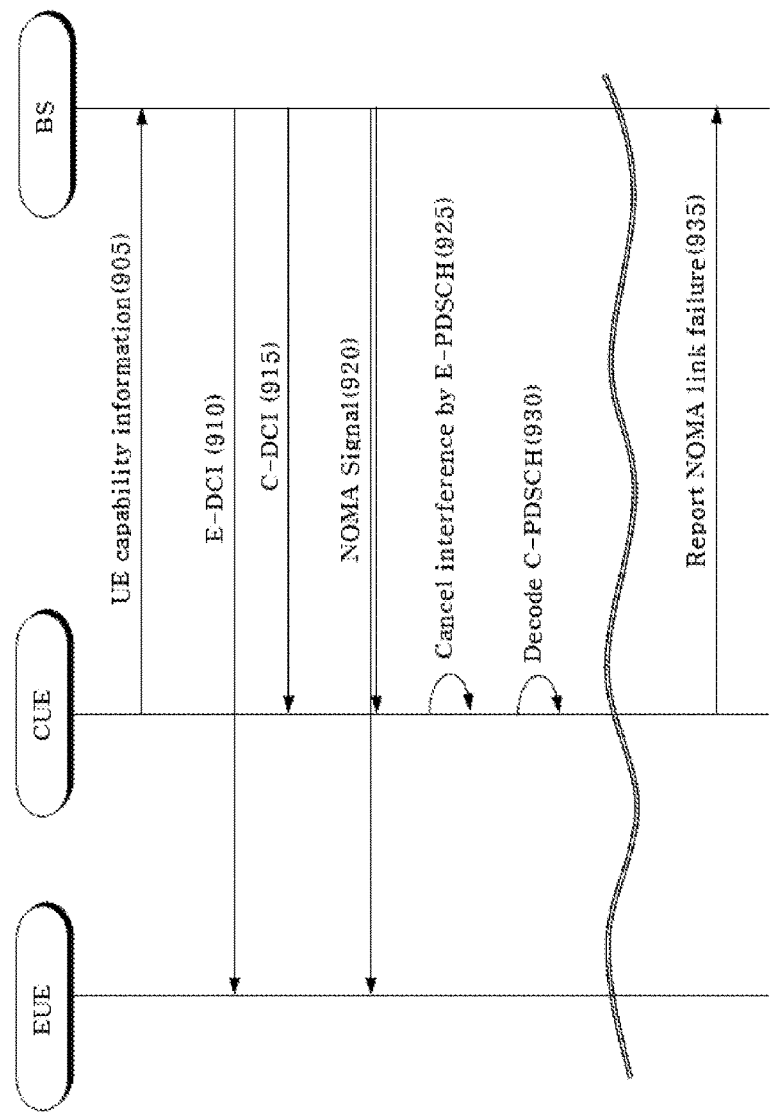
FIG. 9 shows a flow of a method of transceiving a NOMA signal according to one embodiment of the present invention.

FIG. 9 shows a flow of a method of transceiving a NOMA signal according to one embodiment of the present invention. Description redundant with the aforementioned contents shall be omitted.

Referring to FIG. 9, a CUE reports UE capability information to a base station [905]. The UE capability information may include at least one of information indicating whether the CUE can perform NOMA operation, a size of an additional buffer for the NOMA operation, and a maximum of interferers canceled for the NOMA operation.

The base station can pair the CUE and an EUE into a NOMA UE pair.

The base station sends E-DCI to the EUE [910] and also sends C-DCI to the CUE [915]. The CUE may overhear the E-DCI for the EUE paired with the CUE. According to another embodiment, the CUE may obtain E-DCI through NOMA DCI (downlink control information) format including the C-DCI and the E-DCI.

The base station sends a NOMA signal in which C-PDSCH (physical downlink shared channel) for the CUE and E-PDSCH for the EUE are multiplexed by different transmit power values [920].

The CUE cancels interference caused by E-PDSCH from the NOMA signal based on the E-DCI [925]. For example, if E-PDSCH is retransmitted to the EUE by HARQ process, the CUE can cancel the interference caused by E-PDSCH in a manner of reusing predetermined information obtained by the CUE during the initial transmission for the corresponding HARQ process. Hence, the CUE may omit a process for decoding E-PDSCH from a NOMA signal if the E-PDSCH is a retransmitted PDSCH.

The predetermined information used for the cancellation of interference caused by E-PDSCH may include at least one of a modulation order of E-PDSCH in the initial transmission for the corresponding HARQ process, a transport block size, a new data indicator (NDI) and an information bit sequence obtained by decoding E-PDSCH in the initial transmission.

The CUE can code and modulate the information bit sequence of E-PDSCH stored by the CUE in performing the initial transmission of E-PDSCH. The CUE can estimate an interference signal based on a modulated symbol of the information bit sequence and a current channel state. The CUE can cancel the estimated interference signal from the NOMA signal.

A timing at which NOMA operation for the CUE is initiated may be set different for each of a plurality of HARQ processes configured in the EUE. For example, the NOMA operation for the CUE may be initiated in an initial transmission subframe for each of the plurality of HARQ processes configured in the EUE.

If E-PDSCH is a retransmitted PDSCH, the CUE can assume that MCS information ($I_{MCS}$) for which transmission block size (TBS) index is reserved is not configured in E-DCI.

If E-PDSCH is a retransmitted PDSCH and MCS information ($I_{MCS}$) for which transmission block size (TBS) index is reserved is configured in E-DCI, the CUE can perform symbol level interference cancellation instead of codeword level interference cancellation.

Meanwhile, whether E-PDSCH is a retransmitted PDSCH may be indicated through whether a transmission block size (TBS) index of MCS information ($I_{MCS}$) included in E-DCI is in reserved state, indicated through a new data indicator (NDI) included in E-DCI, or indicated explicitly through a specific field of NOMA DCI (downlink control information) format.

The CUE can decode C-PDSCH from the NOMA signal from which the interference by E-PDSCH is canceled [930].

Meanwhile, despite that there is no degradation in a radio link between the CUE and the base station, if the CUE is unable to perform NOMA operation, the CUE can report NOMA link failure to the base station [935]. For example, the report of the NOMA link failure may be performed if a decoding failure of C-PDSCH occurs over a first threshold, a decoding failure of E-PDSCH occurs over a second threshold, or both failures of C-PDSCH decoding and E-PDSCH decoding occur over a third threshold.

Device Configuration According to Embodiment of Present Invention

Figure 10:
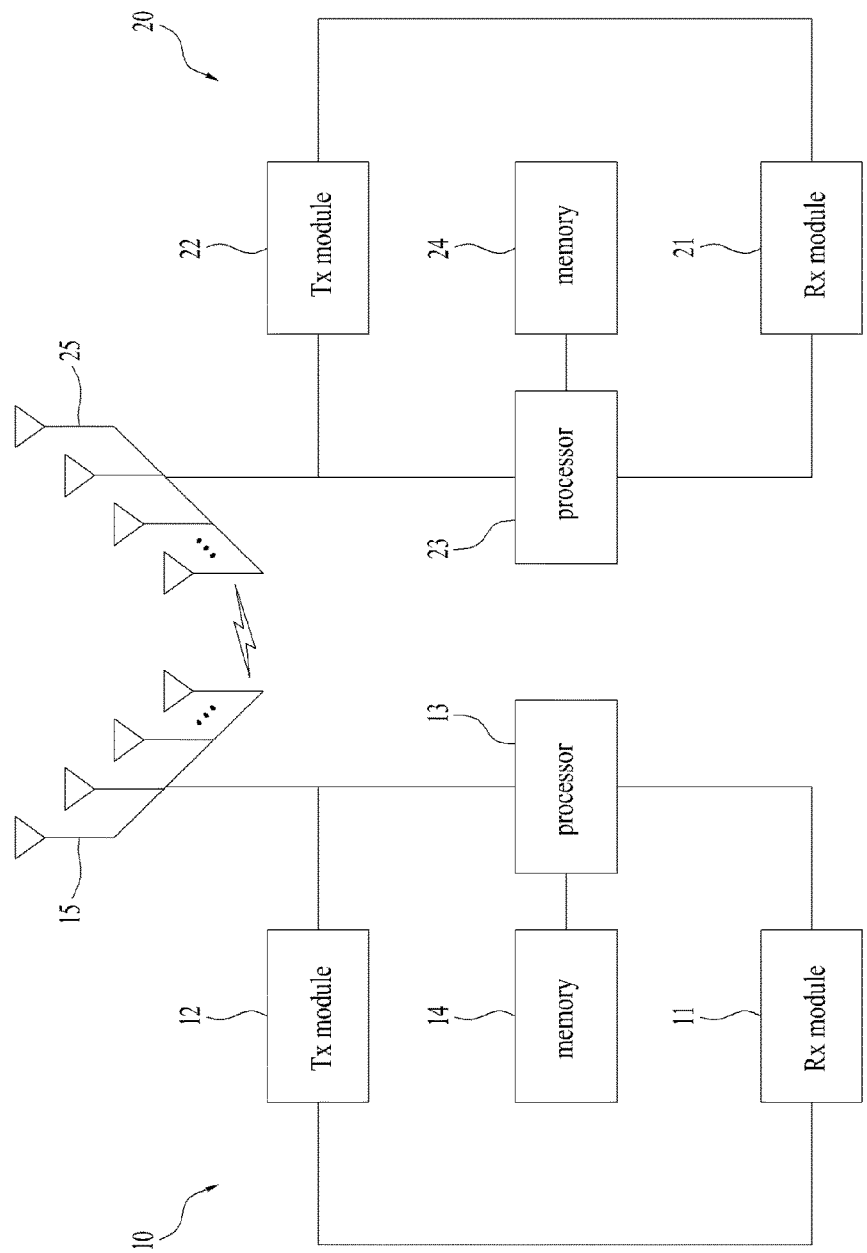
FIG. 10 is a diagram showing configurations of a transmitting point device and a receiving point device according to an embodiment type of the present invention.

FIG. 10 is a diagram showing configurations of a transmitting point device and a receiving point device according to an embodiment type of the present invention. In the drawing, the transmitting point device (e.g., base station) and the receiving point device (e.g., user equipment) can perform the methods of the aforementioned embodiments and description redundant with the aforementioned contents can be omitted.

Referring to FIG. 10, a transmitting point device 10 according to one embodiment of the present invention may include a receiving (Rx) module 11, a transmitting (Tx) module 12, a processor 13, a memory 14 and a plurality of antennas 15. A plurality of the antennas 15 may mean a transmitting point device supportive of MIMO transmission and reception. The receiving module 11 can receive various signals, data and information in uplink from a user equipment. The transmitting module 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and can be substituted with such a component as a buffer (not shown in the drawing) and the like.

Referring still to FIG. 10, a receiving point device 20 according to the present invention may include a receiving module 21, a transmitting module 22, a processor 23, a memory 24 and a plurality of antennas 25. A plurality of the antennas 25 may mean a user equipment device supportive of MIMO transmission and reception. The receiving module 21 can receive various signals, data and information in downlink from a transmitting point. The transmitting module 22 can transmit various signals, data and information in uplink to the transmitting point. And, the processor 23 can control overall operations of the receiving point device 20.

The processor 23 of the receiving point device 20 according to one embodiment of the present invention can process or handle the items required for the respective embodiments mentioned in the foregoing description.

The processor 23 of the receiving point device 20 performs functions of operating and processing information received by the receiving point device 20, information to be transmitted by the receiving point device 20, and the like. The memory 24 can store the operated and processed information and the like for a prescribed period and can be substituted with such a component as a buffer (not shown in the drawing) and the like.

In the above-mentioned detailed configurations of the transmitting point device and the receiving point device, the contents or items explained in the descriptions of the various embodiments of the present invention may be independently applicable or at least two embodiments of the present invention may be simultaneously applicable. And, redundant descriptions shall be omitted from the following description for clarity.

The description of the transmitting point device 10 with reference to FIG. 10 may be identically applicable to a relay node device as a DL transmitting entity or a UL receiving entity. And, the description of the receiving point device 20 with reference to FIG. 10 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. The present invention is non-limited by the embodiments disclosed herein but intends to give a broadest scope matching the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of receiving a signal by a first user equipment in a wireless communication system supporting non-orthogonal multiple access (NOMA), the method comprising:
    obtaining downlink control information for a second user equipment which is NOMA-paired with the first user equipment;
    receiving a NOMA signal in which a first physical downlink shared channel (PDSCH) for the first user equipment and a second PDSCH for the second user equipment are multiplexed by different transmit power values; and
    cancelling interference caused by the second PDSCH from the NOMA signal based on the downlink control information for the second user equipment,
    wherein in the cancelling the interference caused by the second PDSCH, when the second PDSCH is a PDSCH retransmitted to the second user equipment by a hybrid automatic repeat request (HARQ) process, the interference caused by the second PDSCH is canceled by reusing predetermined information obtained by the first user equipment during an initial transmission for the HARQ process.

2. The method of claim 1, wherein when the second PDSCH is the retransmitted PDSCH, a process of decoding the second PDSCH from the NOMA signal is omitted.

3. The method of claim 1, wherein the predetermined information reused for cancelling the interference caused by the second PDSCH includes at least one of a modulation order in the initial transmission for the HARQ process, a transport block size, a new data indicator (NDI) and an information bit sequence obtained by decoding the second PDSCH.

4. The method of claim 1, wherein the cancelling the interference caused by the retransmitted second PDSCH comprises:
    coding and modulating an information bit sequence of the second PDSCH stored by the first user equipment in the initial transmission of the second PDSCH;
    estimating an interference signal based on a modulated symbol of the information bit sequence and a current channel state; and
    cancelling the estimated interference signal from the NOMA signal.

5. The method of claim 1, wherein a timing of initiating a NOMA operation for the first user equipment is differently configured for each of a plurality of HARQ processes which are configured in the second user equipment.

6. The method of claim 5, wherein the NOMA operation for the first user equipment is initiated in an initial transmission subframe for each of the plurality of HARQ processes.

7. The method of claim 1, further comprising:
    reporting, to a base station, capability information of the first user equipment including at least one of information indicating a presence or non-presence of capability of performing the NOMA operation, a size of an additional buffer for the NOMA operation, and a maximum of interferers canceled for the NOMA operation.

8. The method of claim 1, wherein when the second PDSCH is the retransmitted PDSCH, the first user equipment assumes that MCS information ($I_{MCS}$) for which transmission block size (TBS) index is reserved is not configured in the downlink control information for the second user equipment.

9. The method of claim 1, wherein when the second PDSCH is the retransmitted PDSCH and MCS information ($I_{MCS}$) for which transmission block size (TBS) index is reserved is configured in the downlink control information for the second user equipment, the first user equipment performs symbol level interference cancellation instead of codeword level interference cancellation.

10. The method of claim 1, further comprising:
reporting a NOMA link failure to a base station, when the first user equipment is unable to perform a NOMA operation despite that there is no degradation in a radio link between the first user equipment and the base station.

11. The method of claim 10, wherein the report of the NOMA link failure is performed when a decoding failure of the first PDSCH occurs more than a first threshold, a decoding failure of the second PDSCH occurs more than a second threshold, or both failures of a decoding of the first PDSCH and a decoding of the second PDSCH occur more than a third threshold.

12. A first user equipment for receiving a signal in a wireless communication system supporting non-orthogonal multiple access (NOMA), the first user equipment comprising:
a receiver to obtain downlink control information for a second user equipment which is NOMA-paired with the first user equipment and to receive a NOMA signal in which a first physical downlink shared channel (PDSCH) for the first user equipment and a second PDSCH for the second user equipment are multiplexed by different transmit power values; and
a processor to cancel interference caused by the second PDSCH from the NOMA signal based on the downlink control information for the second user equipment,
wherein when the second PDSCH is a PDSCH retransmitted to the second user equipment by a hybrid automatic repeat request (HARQ) process, the processor cancels the interference caused by the second PDSCH by reusing predetermined information obtained by the first user equipment during an initial transmission for the HARQ process.

13. The user equipment of claim 12, wherein when the second PDSCH is the retransmitted PDSCH, the processor omits a process of decoding the second PDSCH from the NOMA signal.

14. The user equipment of claim 12, wherein the processor codes and modulates an information bit sequence of the second PDSCH stored by the first user equipment in the initial transmission of the second PDSCH, estimates an interference signal based on a modulated symbol of the information bit sequence and a current channel state, and cancels the estimated interference signal from the NOMA signal.

15. The user equipment of claim 12, wherein a timing of initiating a NOMA operation for the first user equipment is differently configured for each of a plurality of HARQ processes which are configured in the second user equipment.

* * * * *